United States Patent Office 3,812,156
Patented May 21, 1974

3,812,156
PROCESS FOR PREPARING LOWER ALKYL
FLAVONE-7-OXYACETATES
Giuseppe Bonola, San Donato Milanese, and Enrico
Sianesi, Milan, Italy, assignors to Recordati SA Chemical and Pharmaceutical Company, Lugano, Switzerland
No Drawing. Filed Oct. 21, 1971, Ser. No. 191,479
Claims priority, application Italy, Feb. 19, 1971,
20,755/71
Int. Cl. C07d 7/34
U.S. Cl. 260—345.2                                6 Claims

ABSTRACT OF THE DISCLOSURE

Lower alkyl esters of flavone-7-oxyacetic acid are made by reacting chloroacetonitrile with resacetophenone to give 2'-hydroxy-4'-cyanomethoxy acetophenone, reacting the latter compound with benzoyl chloride to give 1-(2-hydroxy-4-cyanomethoxy phenyl)-3-phenyl propane-1,3-dione and then reacting the latter compound with an anhydrous lower alkanol in the presence of a mineral acid.

Ethyl flavone-7-oxyacetate having the formula:

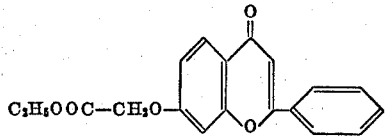

is a known product which is used therapeutically for its remarkable dilator action on the coronaries, associated with an extremely low toxicity.

The prior methods used for its preparation are the following:

A first method, which is the object of Swiss Pat. No. 358,092, is fairly simple, since it starts from 7-hydroxy flavone in which the flavone ring is already formed, but which requires 7-hydroxy flavone, which is difficult to find on the market, for carrying it out.

A second method, which is the object of Swiss Pat. No. 375,020, on the contrary starts from a simpler product which is easily found on the market, i.e. resacetophenone; but has the drawback of requiring 4 stages with recoveries of intermediates, which make it particularly tedious. For this reason the yield is low (20.5% of uncrystallized product, i.e. not pure enough for pharmaceutical use, the yield being based on resacetophenone).

The object of this invention is a novel process for preparing lower alkyl flavone-7-oxyacetates, particularly ethyl flavone-7-oxyacetate. Although this process starts from resacetophenone, it allows a product to be obtained with fewer stages which, because of its purity characteristics is already suitable for pharmaceutical use.

The process according to the invention comprises the following steps: (a) chloroacetonitrile is reacted with resacetophenone to give 2'-hydroxy-4'-cyanomethoxy acetophenone, (b) the latter is reacted with benzoyl chloride to give 1-(2-hydroxy-4-cyanomethoxyphenyl)-3-phenylpropane-1,3-dione and (c) the latter is reacted with an anhydrous lower alkanol in the presence of a mineral acid.

The following diagram represents a preferred embodiment of this process:

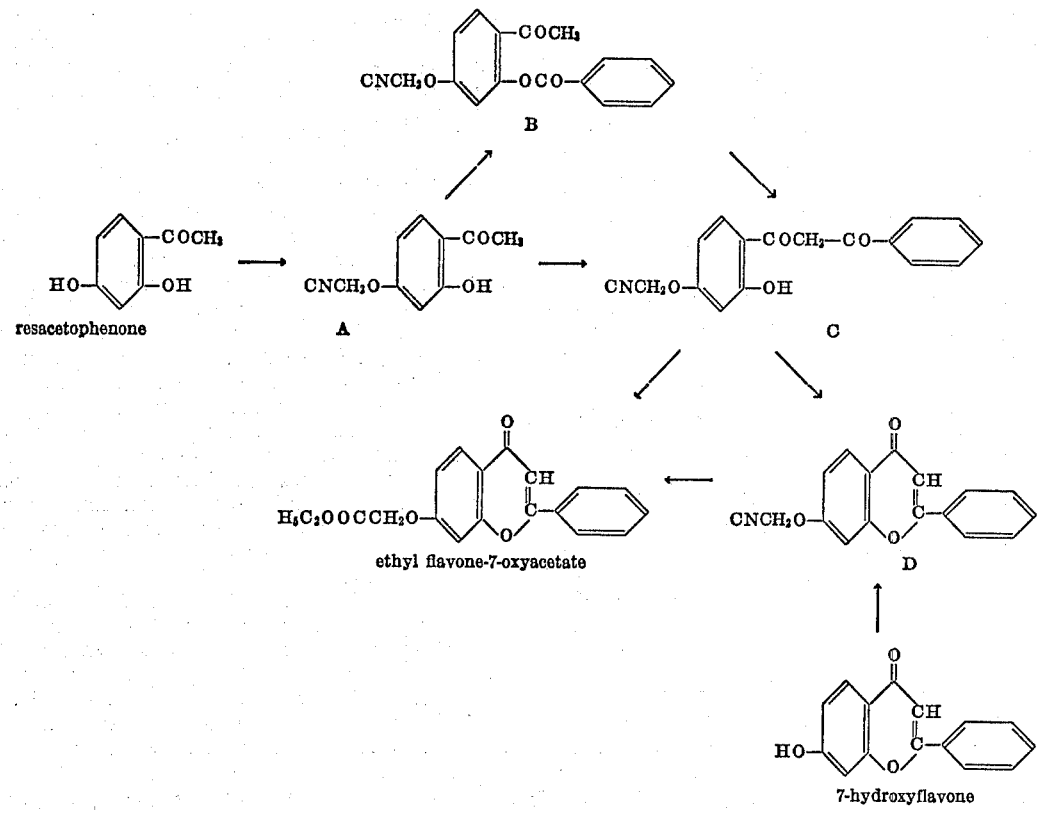

First the resacetophenone is treated with chloracetonitrile, preferably dissolved in a volatile aliphatic ketone such as acetone or methylethylketone, in the presence of an alkali carbonate such as $K_2CO_3$ and a catalyst, for instance KI. Preferably equimolecular amounts of the reagents are used, and the reaction can take place within a period of two hours at the solvent's refluxing temperature.

2'-hydroxy-4'-cyanomethoxy acetophenone (A) is thus obtained, which is then treated with benzoyl chloride, preferably an equimolecular amount in a solvent similar to the one used in the first step, also in the presence of an excess of alkali carbonate, such as $K_2CO_3$. By refluxing the solution for 8 to 9 hours, 1-(2-hydroxy-4-cyanomethoxy phenyl)-3-phenyl-propane-1,3-dione (C) is obtained directly.

Alternately, the same intermediate may be obtained by rearranging in the presence of potassium hydroxide, the 2'-benzoyloxy-4'-cyanomethoxy acetophenone (B), itself obtained by benzoylation of 2'-hydroxy-4'-cyanomethoxy-acetophenone (A), with benzoyl chloride in pyridine.

Lastly, the ethyl flavone-7-oxyacetate is obtained in the best conditions by treating 1-(2-hydroxy-4-cyanomethoxy phenyl)-3-phenylpropane-1,3-dione (C) in absolute ethanol containing a concentrated mineral acid such as hydrogen chloride gas, or preferably concentrated sulfuric acid. Preferably the process is carried out by heating the reaction vessel in a bath at 90-130° C. for a period of 2 to 10 hours. During this treatment, first a ring closure of compound (C) into 7-cyanomethoxy flavone (D) takes place, followed by the conversion of the —CN group into a —$COOC_2H_5$ group. Compound (D) was isolated in these experiments and was shown to be identical with the 7-cyanomethoxy flavone obtained by reacting 7-hydroxyflavone with chloroacetonitrile.

2' - hydroxy - 4' - cyanomethoxy acetophenone, 2'-benzoyloxy - 4' - cyanomethoxy acetophenone, 1-(2-hydroxy - 4 - cyanomethoxy-phenyl)-3-phenyl propane-1,3-dione and 7-cyanomethoxy flavone are all novel compounds.

The following example illustrates the invention.

EXAMPLE

2'-hydroxy-4'-cyanomethoxy acetophenone (formula A)

1.38 g. of anhydrous potassium carbonate and a small catalytic amount of potassium iodide are added to a solution of 1.52 g. of resacetophenone in 5 ml. of anhydrous acetone. A solution of 0.76 g. of chloroacetonitrile in 1.5 ml. of acetone is added dropwise, over a period of 10 minutes, into the refluxing and well-stirred mixture, and it is refluxed and stirred for another two hours. It is then cooled, the solvent is removed, the residue is treated with water and extracted with ether. The ether solution is washed with sodium carbonate, then with water, it is dried ($Na_2SO_4$ and active charcoal) and evaporated. The residue (1.67 g.) is crystallized from 50% ethanol; 1.5 g. melting at 90° C. are obtained.

*Analysis.*—Calculated for $C_{10}H_9NO_3$ (percent): C, 62.82; H, 4.75; N, 7.33. Found (percent): C, 62.67; H, 4.41; N, 7.70.

2'-benzoyloxy-4'-cyanomethoxy acetophenone (formula B)

1.55 g. of benzoyl chloride are added dropwise into a solution of 1.91 g. of 2'-hydroxy-4'-cyanomethoxy acetophenone in 5 ml. of anhydrous pyridine, with stirring. An exothermic reaction results. The mixture is set aside for 30 minutes, then it is poured into water and acidified with 1:1 HCl (cold). The product which separates is extracted with chloroform, the chloroform solution is washed with water, with dilute sodium hydroxide and then with water, it is dried ($Na_2SO_4$) and evaporated. The residue of 2.75 g. gives 2.57 g. of product, after crystallization from isopropanol, melting point 89° C.

*Analysis.*—Calculated for $C_{17}H_{13}NO_4$ (percent): C, 69.17; H, 4.44; N, 4.75. Found (percent): C, 68.97; H, 4.02; N, 4.79.

1-(2-hydroxy-4-cyanomethoxyphenyl)-3-phenyl propane-1,3-dione (formula C)

(1) To a solution of 2.95 g. of 2'-benzoyloxy-4'-cyanomethoxy acetophenone in 15 ml. of anhydrous pyridine heated to 50° C., 1 g. of potassium hydroxide, rapidly ground in a mortar under anhydrous benzene, is added, and the mixture is stirred for 15 minutes at 50° C. During this period a large amount of yellow solid is formed. The mixture is cooled to room temperature and acidified with 100 ml. of 10% acetic acid. A solution is obtained, from which after being set aside, the product crystallizes out; the latter is collected, washed with water and dried in warm air; 1.62 g. of a yellow solid melting at 97–100° C. are obtained, and which by thin layer chromatography is shown to be practically pure. 1.25 g. melting at 100° C. are obtained by crystallization from methanol.

(2) 3.84 g. of 2'-hydroxy-4'-cyanomethoxy acetopheone in 75 ml. of acetone are refluxed for 9 hours with 3.5 g. of benzoyl chloride and 10 g. of $K_2CO_3$, with stirring. It is left to cool, it is poured into $H_2O$, and acidified with acetic acid, filtered and crystallized in methanol; 3.8 g. melting at 97–100° C. are obtained.

*Analysis.*—Calculated for $C_{17}H_{13}NO_4$ (percent): C, 69.17; H, 4.44; N, 4.75. Found (percent): C, 68.87; H, 4.26; N, 4.74.

7-cyanomethoxy flavone (formula D)

To a solution of 2.38 g. of 7-hydroxyflavone in 10 ml. of dimethylformamide, 1.38 g. of anhydrous potassium carbonate, and a small catalytic amount of potassium iodide are added. Then 0.83 g. of chloroacetonitrile are added dropwise into the mixture which is stirred in a boiling water-bath. When the addition is completed, the mixture is stirred for another hour in a boiling water-bath, then it is cooled and poured into 100 ml. of water. The solid precipitated is then extracted with methylene chloride, the extract is washed with dilute sodium hydroxide, then with water, it is dried ($Na_2SO_4$), and evaporated; 2.22 g. of white solid melting at 182–183° C. are obtained, shown to be unitary by thin layer chromatography. The product can be crystallized from methanol.

*Analysis.*—Calculated for $C_{17}H_{11}NO_3$ (percent): C, 73.65; H, 4.00; N, 5.05. Found (percent): C, 73.80; H, 4.10; N, 5.06.

Ethyl flavone-7-oxyacetate (1) To a slurry of 1.48 g. of 1-(2'-hydroxy-4'-cyanomethoxyphenyl)-3-phenyl propane-1,3-dione in 10 ml. of absolute ethanol, 3 ml. of concentrated ($d=1.84$) sulfuric acid are added. Heat is generated, the solid dissolves, and from this solution a white product crystallizes out in a few minutes. The mixture is refluxed for 7 hours in a bath at 130° C. After about 20 minutes, the solid has dissolved. At the end of the reaction, the mixture is poured into ice water and set aside for an hour. The product is extracted in ether, and the ether solution is washed with sodium bicarbonate, then with water, it is dried ($Na_2SO_4$) and evaporated; 1.40 g. of product melting at 122–124° C., already sufficiently pure for pharmaceutical use, are obtained. After crystallization from 50% ethanol 1.30 g. of product melting at 123.5-124.5° C. are obtained, which is shown to be unitary by thin-layer chromatography.

(2) Into a slurry of 1.48 g. of 1-(2-hydroxy-4-cyanomethoxyphenyl)-3-phenyl propane-1,3-dione in 25 ml. of absolute ethanol, heated to 90° C., a stream of dry HCl gas is passed for 2 hours. The starting product first goes into solution, then from this solution a solid is precipitated out and is slowly redissolved. At the end of the reaction it is cooled, poured into water and the above process is carried out. 1.30 g. of crude product melting at 121–124° C. are obtained; 1.00 g. of product melting at 124–125° C. is obtained from 50% ethanol, which is shown to be unitary by thin layer chromatography.

(3) Into a slurry of 2.77 g. of 7-cyanomethoxy flavone in 50 ml. of absolute ethanol a stream of dry HCl gas is passed for 2 hours, with external cooling by ice water, the reaction being protected from moisture. It is left then overnight, then it is treated carefully with water (100 ml. total) the temperature being kept below 10° C. with cooling. A slightly cloudy solution is obtained, from which a flocculent solid separates out after a few minutes. It is left for 15 minutes, and then extracted with ether. The ether solution is washed with sodium bicarbonate, and then with water, it is dried ($Na_2SO_4$), and evaporated; 2.90 g. of white solid melting at 123–124° C. are obtained. 2.60 g. melting at 123.5–124.5° C. are obtained from 50% ethanol.

*Analysis.*—Calculated for $C_{19}H_{16}O_5$ (percent): C, 70.36; H, 4.97. Found (percent): C, 70.22; H, 5.15.

What is claimed is:

1. A process for preparing a lower alkyl flavone-7-oxyacetate, comprising the following steps: (a) chloroacetonitrite is reacted with resacetophenone to give 2′-hydroxy-4′-cyanomethoxy acetophenone, (b) the latter is reacted with benzoyl chloride to give 1-(2-hydroxy-4-cyanomethoxy phenyl)-3-phenyl propane-1,3-dione and (c) the latter is reacted with an anhydrous lower alkanol in the presence of a mineral acid.

2. A process according to claim 1 for preparing ethyl flavone-7-oxyacetate, in which the lower alkanol used in step (c) is ethanol.

3. A process according to claim 1 in which the reaction of step (a) is carried out in acetone as solvent, in the presence of potassium carbonate and potassium iodide.

4. A process according to claim 1 in which the reaction of step (b) is carried out in acetone as solvent, in the presence of potassium carbonate.

5. A process according to claim 1 in which the reaction of step (b) is carried out in pyridine, thus producing 2′-benzoyloxy-4′-cyanomethoxy acetophenone as in intermediate, and the latter is rearranged to 1-(2-hydroxy-4-cyanomethoxy phenyl)-3-phenyl propane-1,3-dione in the presence of potassium hydroxide.

6. 7-cyanomethoxy flavone.

References Cited
UNITED STATES PATENTS 2,897,211   7/1959   Da Re _____ 260—345.2

JOHN M. FORD, Primary Examiner

U.S. Cl. X.R.

260—465 F, 465 R; 424—283